(12) United States Patent
Nam et al.

(10) Patent No.: US 10,395,454 B2
(45) Date of Patent: Aug. 27, 2019

(54) VEHICLE REMOTE KEY SYSTEM AND SMART KEY AUTHENTICATION METHOD FOR THE SAME

(71) Applicant: RESEARCH COOPERATION FOUNDATION OF YEUNGNAM UNIVERSITY, Gyeongsan-si, Gyeongsangbuk-do (KR)

(72) Inventors: Seung Yeob Nam, Daegu (KR); Woojoo Shin, Daegu (KR)

(73) Assignee: Research Company Foundation of Yeungnam University, Gyeongsan-si (KR)

( * ) Notice: Subject to any disclaimer, the term of this patent is extended or adjusted under 35 U.S.C. 154(b) by 0 days.

(21) Appl. No.: 15/893,345

(22) Filed: Feb. 9, 2018

(65) Prior Publication Data

US 2019/0066412 A1 Feb. 28, 2019

(30) Foreign Application Priority Data

Aug. 31, 2017 (KR) .......................... 10-2017-0111286

(51) Int. Cl.
| | |
|---|---|
| G07C 9/00 | (2006.01) |
| G06F 7/58 | (2006.01) |
| G01S 19/51 | (2010.01) |
| H04W 4/02 | (2018.01) |

(52) U.S. Cl.
CPC .......... *G07C 9/00023* (2013.01); *G01S 19/51* (2013.01); *G06F 7/58* (2013.01); *G07C 9/00119* (2013.01); *H04W 4/023* (2013.01)

(58) Field of Classification Search
CPC ........................... G07C 9/00023; H04W 4/023

USPC ........................................................ 340/5.61
See application file for complete search history.

(56) References Cited

U.S. PATENT DOCUMENTS

2017/0158169 A1* 6/2017 Luo ........................ B60R 25/245

FOREIGN PATENT DOCUMENTS

| JP | 2006-016791 A | 1/2006 |
|---|---|---|
| KR | 10-1334562 B1 | 11/2013 |
| KR | 10-2014-0052099 A | 5/2014 |
| KR | 10-1565848 B1 | 11/2015 |
| KR | 10-1698103 B1 | 1/2017 |

* cited by examiner

*Primary Examiner* — Vernal U Brown
(74) *Attorney, Agent, or Firm* — Novick, Kim & Lee, PLLC; Sang Ho Lee

(57) ABSTRACT

A smart key authentication method for a vehicle remote key system that includes a smart key performing bi-directional communication with a vehicle to control the vehicle and a vehicle authentication module provided at the vehicle to authenticate the smart key is provided. The smart key authentication method includes generating, by the vehicle authentication module, a random number and sharing the random number with the smart key and performing a first authentication process based on the random number, and performing, by the vehicle authentication module, a second authentication process by comparing at least one location information value among an access point (AP) list, a satellite-based positioning sensor value, or a geomagnetic sensor value, which are respectively measured at the vehicle and at the smart key and determining whether or not to permit an authentication to the smart key.

19 Claims, 6 Drawing Sheets

VEHICLE REMOTE KEY SYSTEM AND SMART KEY AUTHENTICATION METHOD FOR THE SAME

CROSS-REFERENCE TO RELATED APPLICATION

This application claims priority to Korean Patent Application No. 10-2017-0111286, filed on Aug. 31, 2017, and all the benefits accruing therefrom under 35 U.S.C. § 119, the contents of which in its entirety are herein incorporated by reference.

BACKGROUND

1. Field

The present disclosure relates to a vehicle remote key system and a smart key authentication method for the vehicle remote key system, and more particularly, to a vehicle remote key system for performing authentication between a smart key and a vehicle to remotely control the vehicle by the smart key, and a smart key authentication method for the vehicle remote key system.

2. Description of the Related Art

With the development of information communication technology, the convergence of vehicle technology and information communication technology is causing a great impact on the vehicle industry, and as a result, security issues are becoming increasingly important since they are directly associated with user safety.

Meanwhile, most of recently released vehicles use a vehicle remote key system that controls various functions of the vehicle such as door opening, door closing and starting using a smart key. Looking at the operations of the vehicle remote key system, if the smart key sends an encrypted authentication request signal to the vehicle, the vehicle receives and decrypts the corresponding signal, performs an authentication process, and then, if required, sends back a response signal to complete the authentication process.

As described above, the vehicle remote key system performs various functions by transmitting and receiving a predetermined security signal by using bi-directional communication between the smart key and the vehicle. However, the vehicle remote key system is susceptible to an amplification attack that may occur in bidirectional communication, and resultant damage cases are increasing. Here, the amplification attack is an attack for unlocking a vehicle by amplifying a signal sent by the smart key and delivering the amplified signal to the vehicle, even though a user possessing the smart key is far away from the vehicle.

FIG. 1 is a diagram showing an example of an amplification attack that may occur in the vehicle remote key system.

Referring to FIG. 1, the amplification attack generally involves two attackers (an attacker A and an attacker B). The attacker A is located near the smart key, extracts a signal of the smart key, and transmits the signal to the attacker B. The attacker B is located near the vehicle and may receive the signal transmitted by the attacker A, and delivers the signal to the vehicle. In this way, the attacker may unlock the vehicle by pretending that a driver, namely the smart key, is near the vehicle.

As described above, the vehicle remote key system has advantages in that a user may conveniently release the lock and start the engine without inserting a key into the vehicle, but on the other hand, it is vulnerable to an amplification attack and thus there is a risk of vehicle theft. Accordingly, there is a need for a new authentication method between a smart key and a vehicle so that the vehicle remote key system may be protected against an amplification attack.

SUMMARY

The present disclosure is directed to providing an authentication system and method between a smart key and a vehicle, which uses comparison of locations of the smart key and the vehicle.

In one aspect of the present disclosure, there is provided a smart key authentication method for a vehicle remote key system that includes a smart key for performing bi-directional communication with a vehicle to control functions of the vehicle and a vehicle authentication module provided at the vehicle to authenticate the smart key.

The smart key authentication method includes generating, by the vehicle authentication module, a random number and sharing the random number with the smart key and performing a first authentication process based on the random number, and performing, by the vehicle authentication module, a second authentication process by comparing at least one location information value among an access point (AP) list, a satellite-based positioning sensor value, or a geomagnetic sensor value, which are respectively measured at the vehicle and at the smart key and determining whether or not to permit an authentication to the smart key.

The smart key generates a first random number, and when smart key authentication information containing the first random number is transmitted to the vehicle authentication module, the smart key receives a response signal containing the first random number and a second random number generated by the vehicle authentication module, and the smart key verifies the response signal with the first random number, and, when the response signal is verified, the smart key extracts smart key location information including at least one of the AP list, the satellite-based positioning sensor value, and the geomagnetic sensor value; generates an authentication request signal containing the smart key location information and the second random number received from the vehicle authentication module; and transmits the authentication request signal to the vehicle authentication module.

In addition, the smart key encrypts the first random number and an inherent ID of the smart key with a stored symmetric key, generate the smart key authentication information, and transmits the smart key authentication information to the vehicle authentication module, and the smart key receives the response signal including the first random number which is encrypted by the vehicle authentication module with the stored symmetric key and the second random number which is generated by the vehicle authentication module and either encrypted or not encrypted by the vehicle authentication module depending on a predetermined setting.

In addition, the vehicle authentication module performs the first authentication process by comparing the second random number contained in the authentication request signal with the second random number generated by the vehicle authentication module.

In addition, the vehicle authentication module performs the first authentication process by decrypting the authentication request signal with the stored symmetric key and extracting the second random number contained in the authentication request signal received from the smart key, and comparing the second random number contained in the authentication request signal with the second random number generated by the vehicle authentication module.

In addition, the second authentication process is performed when the first authentication for the smart key is permitted in the first authentication process, and the vehicle authentication module compares the at least one location information value among the AP list, the satellite-based positioning sensor value, or the geomagnetic sensor value, and, when a predetermined authentication permission condition is met, the vehicle authentication module determines to permit the authentication to the smart key.

When the second authentication process is performed by comparing the location information of the AP list, the vehicle authentication module checks whether a common AP ratio is greater than a predetermined value, the common AP ratio being a ratio of APs commonly included in the AP list measured at the vehicle and the AP list measured at the smart key out of the total of the AP list measured at the vehicle and the AP list measured at the smart key.

In addition, when the second authentication process is performed by comparing the location information of the satellite-based positioning sensor value and the geomagnetic sensor value, the vehicle authentication module checks whether a sum of a value obtained by multiplying a difference between the satellite-based positioning sensor value measured at the vehicle and the satellite-based positioning sensor value measured at the smart key by a predetermined constant, and a value obtained by multiplying a difference between the geomagnetic sensor value measured at the vehicle and a geomagnetic sensor value measured at the smart key by a predetermined constant is smaller than a predetermined value.

According to another aspect of the present disclosure, a vehicle remote key system is provided. The vehicle remote key system includes a smart key configured to generate a first random number, when smart key authentication information containing the first random number is transmitted to a vehicle authentication module provided at a vehicle, receiving a response signal containing the first random number and a second random number generated by the vehicle authentication module, verifying the response signal with the first random number, when the response signal is verified, extracting smart key location information including at least one of an AP list, a satellite-based positioning sensor value, and a geomagnetic sensor value, generating an authentication request signal containing the smart key location information and the second random number received from the vehicle authentication module, and transmitting the authentication request signal to the vehicle authentication module, and the vehicle authentication module configured to perform a first authentication process by comparing the second random number contained in the authentication request signal with the second random number generated by the vehicle authentication module, when a first authentication for the smart key is permitted according to the first authentication process, extracting vehicle location information corresponding to the smart key location information, and performing a second authentication process by comparing the vehicle location information with the smart key location information contained in the authentication request signal, determining whether or not to permit the authentication to the smart key.

The vehicle authentication module includes a second authentication unit configured to compare at least one location information value among the AP list, the satellite-based positioning sensor value and the geomagnetic sensor value included in the vehicle location information and the smart key location information, and to determine to permit the authentication to the smart key when a predetermined authentication permission condition is met.

The second authentication unit checks whether a common AP ratio is greater than a predetermined value, the common AP ratio being a ratio of APs commonly included in the AP list of the vehicle location information and the AP list of the smart key location information among the AP list of the vehicle location information and the AP list of the smart key location information.

The second authentication unit further checks whether a sum of a value obtained by multiplying a difference between the satellite-based positioning sensor value included in the vehicle location information and the satellite-based positioning sensor value included in the smart key location information by a predetermined constant and a value obtained by multiplying a difference between the geomagnetic sensor value included in the vehicle location information and the geomagnetic sensor value included in the smart key location information by a predetermined constant is smaller than a predetermined value.

The smart key encrypts the first random number and an inherent ID of the smart key with a stored symmetric key, generates the smart key authentication information, transmits the smart key authentication information to the vehicle authentication module, and receives the response signal including the first random number which is encrypted by the vehicle authentication module with the stored symmetric key and the second random number which is generated by the vehicle authentication module and either encrypted or not encrypted by the vehicle authentication module depending on a predetermined setting.

The smart key includes a response signal verifying unit verifying the response signal by decrypting the response signal with the stored symmetric key to extract the first random number received from the vehicle authentication module, and comparing the first random number received from the vehicle authentication module with the first random number generated at the smart key.

The smart key includes an authentication request signal generating unit encrypting the smart key location information and the second random number received from the vehicle authentication module with the stored symmetric key to generate the authentication request signal and transmitting the authentication request signal to the vehicle authentication module.

The vehicle authentication module includes a first authentication unit decrypting the authentication request signal with the stored symmetric key to extract the second random number contained in the authentication request signal received from the smart key, and performing the first authentication process by comparing the second random number contained in the authentication request signal with the second random number generated at the vehicle authentication module.

According to the other aspect of the present disclosure, a smart key authentication method for a vehicle remote key system that includes a smart key for performing bi-directional communication with a vehicle to control the vehicle and a vehicle authentication module provided at the vehicle to authenticate the smart key is provided. The smart key authentication method includes generating, by the vehicle authentication module, a random number and sharing the random number with the smart key and performing a first authentication process based on the random number, and performing, by the vehicle authentication module, a second authentication process by comparing a first AP list measured at the vehicle and a second AP list measured at the smart key and determining whether to permit the authentication to the smart key.

The second authentication process is performed when the first authentication for the smart key is permitted in the first authentication process, and the vehicle authentication module checks whether a common AP ratio is greater than a predetermined value, the common AP ratio being a ratio of APs commonly included in the first AP list measured at the vehicle and the second AP list measured at the smart key among the first and second APs.

The smart key generates a first random number, and when smart key authentication information containing the first random number is transmitted to the vehicle authentication module, the smart key receives a response signal containing the first random number and a second random number generated at the vehicle authentication module from the vehicle authentication module, and the smart key verifies the response signal with the first random number, and, when the response signal is verified, the smart key extracts smart key location information including an AP list, generates an authentication request signal containing the smart key location information and the second random number received from the vehicle authentication module, and transmits the authentication request signal to the vehicle authentication module.

The vehicle authentication module performs the first authentication process by comparing the second random number contained in the authentication request signal with the second random number generated at the vehicle authentication module.

According to the present disclosure as described above, it is possible to improve security and thus prevent an amplification attack by comparing locations of the smart key and the vehicle when the vehicle remote key system authenticates the smart key.

DETAILED DESCRIPTION

Advantages and features of the present disclosure and their solutions will be more apparent from the following detailed description and embodiments taken in conjunction with the accompanying drawings. However, the present disclosure is not limited to the embodiments disclosed below but may be implemented in various ways, and the embodiments are just for more perfect disclosure and better understanding to those having ordinary skilled in the art. The present disclosure is defined just by the scope of the appended claims. Throughout the specification, like reference signs denote like components.

Terms used in the specification is for the purpose of describing the embodiments and are not intended to limit the present disclosure. In this specification, singular forms include plural forms unless the context clearly dictates otherwise. The terms "comprises" and/or "comprising" used in the specification do not exclude the presence or addition of one or more other elements, steps and operations.

The term "unit" or "module" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or any combination of a software, a circuit, or a hardware designed to perform the associated function.

Figure 1:
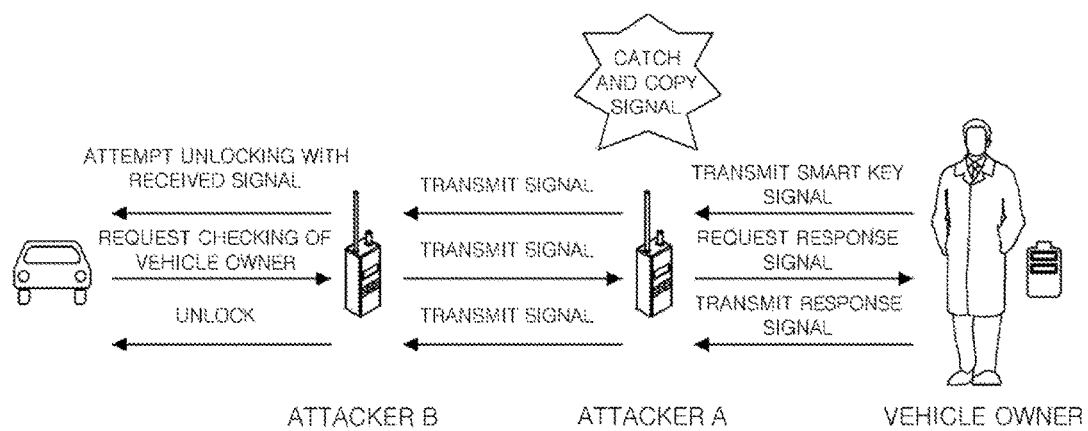
FIG. 1 is a diagram showing an example of an amplification attack that may occur in the vehicle remote key system.
Figure 2:
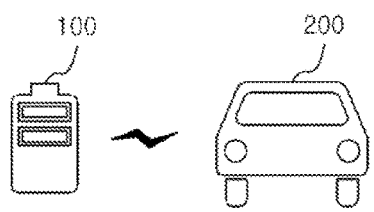
FIG. 2 is a diagram showing a vehicle remote key system according to an embodiment of the present disclosure.

FIG. 2 is a diagram showing a vehicle remote key system according to an embodiment of the present disclosure.

Referring to FIG. 2, a vehicle remote key system 1000 according to an embodiment of the present disclosure includes a smart key 100 and a vehicle 200 and may control various functions of the vehicle 200 such as door opening, door closing and starting by using the smart key 100. For this purpose, a communication is established between the smart key 100 possessed by the user and the vehicle 200. At this time, a vehicle authentication module 240 for performing an authentication procedure between the smart key 100 and the vehicle 200 may be provided at the vehicle 200 for security. In particular, the vehicle remote key system 1000 according to an embodiment of the present disclosure may improve security and lower the risk of vehicle theft by an amplification attack by including an authentication procedure for comparing location information of the smart key 100 and the vehicle 200.

Specifically, the smart key 100 is a device capable of performing bidirectional communication with the vehicle 200 and may be, for example, a FOB. Alternatively, the smart key 100 is not particularly limited as long as it is a device including a module capable of handling the function or operation of the FOB. For example, the smart key 100 may be a PDA, a mobile phone capable of LTE communication, a tablet, or the like, and software (application) for controlling the vehicle remote key system 1000 may be installed and executed therein.

The smart key 100 is possessed by a user, namely a vehicle driver, and may start an authentication procedure for controlling the vehicle by transmitting and receiving signals to/from the vehicle authentication module 240 under the control of the user. If the authentication is successful, the smart key 100 may control various functions of the vehicle remotely.

The vehicle authentication module 240 is a device capable of authenticating the smart key 100 possessed by the user and may be installed at the vehicle. The vehicle authentication module 240 may be, for example, a device included in an electronic control unit (ECU) that controls a vehicle, or may be a separate device linked to the ECU. Alternatively, the vehicle authentication module 240 may have mobility and may be, for example, a server linked to a device that controls the vehicle.

The vehicle authentication module 240 may perform an authentication procedure for the smart key 100 that attempts vehicle control remotely, and if the authentication is successful, the vehicle authentication module 240 may control various functions of the vehicle by using the smart key 100.

Hereinafter, an authentication method between the smart key 100 included in the vehicle remote key system 1000 shown in FIG. 2 and the vehicle authentication module 240 provided at the vehicle 200 will be described in detail with reference to FIG. 3.

Figure 3:
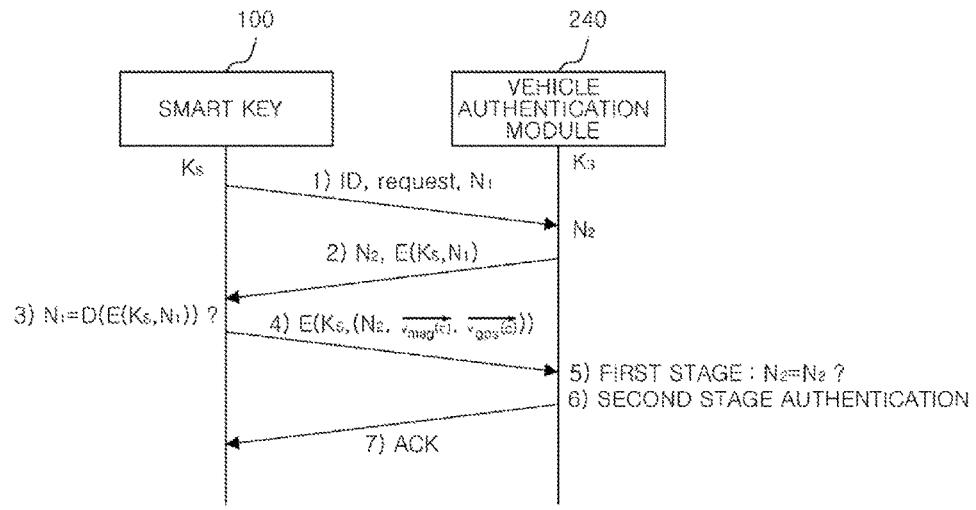
FIG. 3 is a flowchart for illustrating a process of authenticating a smart key in the vehicle remote key system depicted in FIG. 2.

FIG. 3 is a flowchart for illustrating a process of authenticating a smart key in the vehicle remote key system depicted in FIG. 2.

Referring to FIG. 3, first, the smart key 100 and the vehicle authentication module 240 may be in a state of sharing a symmetric key ($K_s$). Here, the symmetric key ($K_s$) may be set by a vehicle manufacturer and stored in the smart key 100 and the vehicle authentication module 240.

If a user possessing the smart key 100 attempts to control the vehicle by using the smart key 100, the smart key 100 may attempt authentication with the vehicle authentication module 240. For this, the smart key 100 may generate a first random number ($N_1$). In addition, the smart key 100 may generate smart key authentication information containing the first random number ($N_1$) and a stored inherent ID of the smart key 100 and transmit the smart key authentication information to the vehicle authentication module 240.

The vehicle authentication module 240 may generate a second random number ($N_2$) if it receives the smart key authentication information from the smart key 100. In addition, the vehicle authentication module 240 may encrypt the first random number ($N_1$) included in the smart key authentication information received from the smart key 100 by using the stored symmetric key ($K_s$).

In addition, the vehicle authentication module 240 may transmit a response signal containing the second random number ($N_2$) and the encrypted first random number ($E(K_s, N_1)$) to the smart key 100. Here, as shown in FIG. 3, the vehicle authentication module 240 may encrypt only the first random number ($N_1$) and transmit the response signal to the smart key 100 without encrypting the second random number ($N_2$), or may encrypt both the first random number ($N_1$) and the second random number ($N_2$) by using the symmetric key ($K_s$) and then transmit the response signal to the smart key 100.

If receiving the response signal from the vehicle authentication module 240, the smart key 100 may verify the corresponding signal. For this, first, the smart key 100 may decrypt the encrypted first random number ($E(K_s, N_1)$) contained in the response signal by using the stored symmetric key ($K_s$). In addition, the smart key 100 may verify the response signal by comparing the first random number ($N_1$) generated in the previous step with the decoded first random number ($D(E(K_s, N_1))$). In other words, if the first random number ($N_1$) generated by the smart key 100 is identical to the first random number ($D(E(K_s, N_1))$) received from the vehicle authentication module 240, the response signal may be determined as a safe signal, and the process may proceed to the next step. In the opposite case, the process may be terminated.

In addition, if the first random number (N1) generated by the smart key 100 is identical to the first random number ($D(E(K_s, N_1))$) received from the vehicle authentication module 240, the smart key 100 may obtain the smart key location information. Here, the smart key 100 may extract the smart key location information by means of a GPS sensor, a geomagnetic sensor and a wireless LAN card, embedded in the smart key 100.

Although the GPS sensor is used as an example herein, the present disclosure is not limited therein but any sensor or device using a satellite-based positioning technology or system can be used. A satellite navigation technology or system may refer to a system or technology that uses satellites to provide geo-spatial positioning. For example, the satellite navigation may allow small electronic receivers to determine their location (longitude, latitude, and altitude/elevation) to high precision. The satellite navigation system or technology may be termed a global navigation satellite system (GNSS), Global Positioning System (GPS), GLONASS (Globalnaya navigatsionnaya sputnikovaya Sistenia), Galileo, or BeiDou Navigation Satellite System.

The smart key 100 may obtain the smart key location information by extracting a GPS value, a geomagnetic sensor value, and an AP list. In addition, the smart key 100 may generate an authentication request signal by encrypting the smart key location information and the second random number ($N_2$) contained in the response signal with the symmetric key ($K_s$), and transmit the authentication request signal to the vehicle authentication module 240.

The vehicle authentication module 240 may perform a two-stage authentication procedure including a first authentication process and a second authentication process based on the authentication request signal received from the smart key 100. First, the vehicle authentication module 240 may decrypt the authentication request signal received from the smart key 100 using the symmetric key ($K_s$) for the first authentication process and the second authentication process. The vehicle authentication module 240 may obtain the smart key location information and the second random number ($D(E(K_s, N_2))$) received from the smart key 100.

The first authentication process is performed based on the second random number ($N_2$). The vehicle authentication module 240 may perform the first authentication process by comparing the second random number ($N_2$) generated in the previous step and the second random number ($D(E(K_s, N_2))$) received from the smart key 100. In other words, if the first random number (($N_2$)) generated by the vehicle authentication module 240 is identical to the second random number ($D(E(K_s, N_2))$) received from the smart key 100, the vehicle authentication module 240 may determine that the authentication is successful and proceed to the next step. In the opposite case, the vehicle authentication module 240 may not permit the authentication for the smart key 100.

The second authentication process is performed based on the smart key location information and may be a process of verifying whether smart key 100 is sufficiently close to vehicle 200. The vehicle authentication module 240 may perform the second authentication process by comparing the location of the vehicle 200 with the smart key location information. For this, the vehicle authentication module 240 may obtain vehicle location information. Here, the vehicle authentication module 240 may extract the vehicle location information through a GPS sensor, a geomagnetic sensor and a wireless LAN card, embedded in the vehicle 200. Alternatively, the vehicle authentication module 240 may obtain the vehicle location information by extracting a GPS value, a geomagnetic sensor value and an AP list, stored in the vehicle 200. In addition, the vehicle authentication module 240 may compare the vehicle location information with the smart key location information, and then, if the comparison result satisfies a predetermined condition, the vehicle authentication module 240 may determine that the authentication for the smart key 100 is successful. In this case, an authentication check signal (ACK) may be sent to the smart key 100, if required. Meanwhile, if the comparison result of the vehicle location information and the smart key location information does not satisfy the predetermined condition, the vehicle authentication module 240 may not authenticate the smart key 100.

Here, the vehicle authentication module 240 may compare the GPS sensor values, the geomagnetic sensor values and the AP lists, respectively included in the vehicle location information and the smart key location information, and determine whether the authentication for the smart key 100 is successful by checking whether the comparison result of any one location information value among the GPS sensor value, the geomagnetic sensor value and the AP list satisfies a predetermined condition or whether the comparison result of at least two location information values satisfy a predetermined condition. Here, in order to improve security by comparing various location information values, it is desirable to check whether the comparison results of all of the three location information values satisfy the predetermined conditions and determine whether the authentication for the smart key 100 is successful according to the result.

If the smart key authentication method in the vehicle remote key system 1000 according to an embodiment of the present disclosure is used, since the smart key 100 and the vehicle authentication module 240 generate random numbers, respectively, it is possible to improve the security because different random numbers are used at every attempting authentication. In addition, it is possible to more accurately confirm whether the smart key 100 is sufficiently close to the vehicle 200, namely whether the attempt to control the vehicle is an amplification attack, by comparing various location information values such as the GPS sensor value, the geomagnetic sensor value and the AP list. Finally, the security may be improved by allowing authentication for the smart key 100 only when all the two-stage authentication procedures are successful.

Hereinafter, each component included in the vehicle remote key system 1000 will be described in detail with reference to FIGS. 4 to 9.

Figure 4:
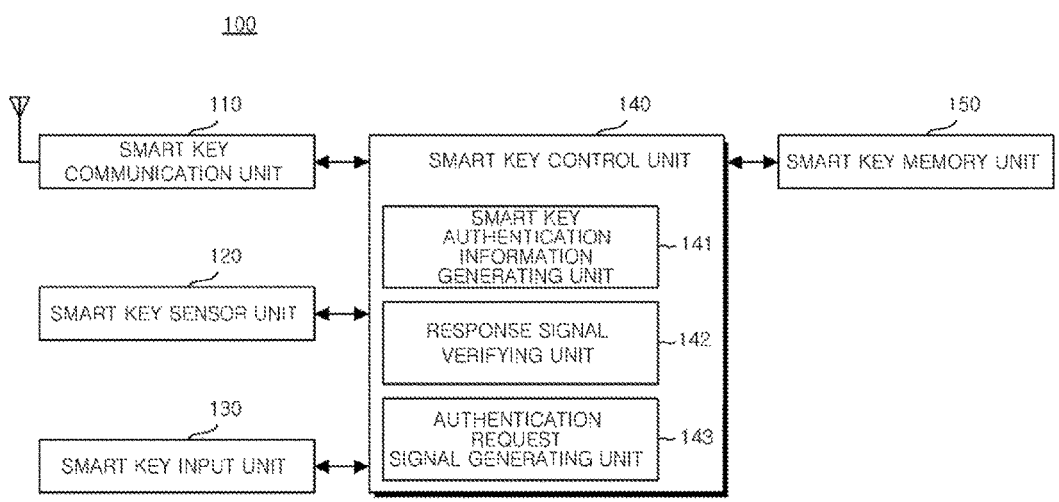
FIG. 4 is a control block diagram for the smart key depicted in FIG. 2.

First, FIG. 4 is a control block diagram for the smart key depicted in FIG. 2.

Referring to FIG. 4, the smart key 100 may include a smart key communication unit 110, a smart key sensor unit 120, a smart key input unit 130, a smart key control unit 140, and a smart key memory unit 150. The smart key 100 performs bi-directional communication with the vehicle authentication module 240 for an authentication procedure for remote control of the vehicle, and the smart key 100 may generate information for performing the authentication procedure with the vehicle authentication module 240 and transmit the generated information to the vehicle authentication module 240. Hereinafter, each component of the smart key 100 will be described.

The smart key communication unit 110 enables communication between the smart key 100 and the vehicle authentication module 240. For this, the smart key communication unit 110 may be implemented with one or more components for performing wireless communication or near-field wireless communication. For example, the smart key communication unit 110 may be implemented including a component that enables any communication of among Bluetooth, 3G, 4G, 5G, infrared and wireless LAN communications. Here, the smart key communication unit 110 may transmit or receive predetermined information to/from the vehicle authentication module 240 to perform the authentication procedure for controlling the vehicle.

Also, the smart key communication unit 110 may be implemented including a wireless LAN card for checking the location information of the smart key 100. This is to obtain the AP list among the location information of the smart key 100 required to perform the authentication procedure between the smart key 100 and the vehicle authentication module 240. In other words, a list of APs measured in the smart key 100 may be obtained through the wireless LAN card included in the smart key communication unit 110, and the authentication procedure between the smart key 100 and the vehicle authentication module 240 may be performed using the list of APs.

The smart key sensor unit 120 is provided to obtain the location information of the smart key 100 that is required to perform the authentication procedure between the smart key 100 and the vehicle authentication module 240, and may be implemented including a GPS sensor and a geomagnetic sensor.

Specifically, the GPS sensor receives data transmitted from satellites and measures a location on the earth. Since the GPS sensor updates new position data whenever receiving data, the coordinate information may be changed according to the location of the user.

In addition, the geomagnetic sensor is used to calculate absolute azimuth information which is an angle between a magnetic north and the sensor direction, by measuring the intensity of the earth magnetic field. The geomagnetic sensor may be implemented as a three-axis (x, y, z) geomagnetic sensor module, where three axes are perpendicular to each other.

The smart key sensor unit 120 may obtain a GPS sensor value and a geomagnetic sensor value measured at the smart key 100 by including the GPS sensor and the geomagnetic sensor. The GPS sensor value and the geomagnetic sensor value measured at the smart key 100 may be used in the authentication process for the smart key 100 by the vehicle authentication module 240.

The smart key input unit 130 may generate input data for controlling the operation of the smart key 100 by the user. For this purpose, the smart key input unit 130 may include a keypad, a dome switch, a touch pad, a jog wheel, a jog switch or the like. The smart key input unit 130 allows the user to remotely control the vehicle using the smart key 100. For example, when an input signal is detected in the smart key input unit 130, the authentication procedure between the smart key 100 and the vehicle authentication module 240 may be performed, and the vehicle may be remotely controlled according to the input data generated at the smart key input unit 130.

The smart key control unit 140 may control overall operations of the smart key 100. In particular, the smart key control unit 140 may perform the authentication procedure with the vehicle authentication module 240. For this, the smart key control unit 140 may include a smart key authentication information generating unit 141, a response signal verifying unit 142, and an authentication request signal generating unit 143.

Specifically, the smart key authentication information generating unit 141 may generate smart key authentication information for initiating the authentication procedure with the vehicle authentication module 240. If the user attempts to control the vehicle 200 using the smart key 100, the smart key authentication information generating unit 141 may generate the smart key authentication information to be transmitted to the vehicle authentication module 240 in order to start the authentication process with the vehicle authentication module 240.

Here, the smart key authentication information may contain the inherent ID of the smart key 100 and the first random number ($N_1$). Thus, the smart key authentication information generating unit 141 may generate the first random number ($N_1$) firstly. At this time, the smart key authentication information generating unit 141 may generate a new random number whenever attempting authentication with the vehicle authentication module 240, and the generated random number may be temporarily stored in the smart key memory unit 150. As described above, the smart key authentication information generating unit 141 may generate the smart key authentication information containing the generated first random number ($N_1$) and the inherent ID of the smart key 100 stored in the smart key memory unit 150 and transmit the generated smart key authentication information to the vehicle authentication module 240 by means of the smart key communication unit 110.

Meanwhile, the smart key authentication information generating unit 141 may start time measurement when the smart key authentication information is transmitted to the vehicle authentication module 240. This is to check the time taken to perform authentication between smart key 100 and vehicle authentication module 240.

The response signal verifying unit 142 can verify the response signal received from the vehicle authentication module 240 as a response to the smart key authentication information. If receiving the smart key authentication information from the smart key 100, the vehicle authentication module 240 may generate a response signal and transmit the corresponding response signal to the smart key 100. In this case, the response signal may contain the first random number ($N_1$) encrypted by the symmetric key ($K_s$) and the second random number ($N_2$) generated by the vehicle authentication module 240. Alternatively, the response signal may include the first random number ($N_1$) and the second random number ($N_2$), which are encrypted by the symmetric key ($K_s$). This will be described later in more detail.

The response signal verifying unit 142 may obtain the first random number ($N_1'$) and the second random number ($N_2$) by decrypting the response signal using the stored symmetric key ($K_s$). At this time, the response signal verifying unit 142 may decrypt the response signal using, for example, an AES-128 encryption algorithm. In addition, the response signal verifying unit 142 may verify the response signal by comparing the first random number ($N_1$) generated by the smart key authentication information generating unit 141 with the first random number ($N_1'$) obtained by decrypting the response signal.

If the first random number ($N_1$) generated by the smart key authentication information generating unit 141 and transmitted to the vehicle authentication module 240 is identical to the first random number ($N_1'$) obtained by decrypting the response signal received from the vehicle authentication module 240, the response signal verifying unit 142 may determine that the response signal received from the vehicle authentication module 240 is a safe signal. Meanwhile, in an opposite case, the response signal verifying unit 142 may determine that the response signal received from the vehicle authentication module 240 is an unreliable signal. The response signal verifying unit 142 may transmit the verification result of the response signal to the authentication request signal generating unit 143, explained later, so that the authentication process for the smart key 100 may be continued or stopped.

If the response signal is determined to be a safe signal according to the response signal verification result at the response signal verifying unit 142, the authentication request signal generating unit 143 may generate an authentication request signal required for performing the authentication procedure for the smart key 100 at the vehicle authentication module 240.

Here, the authentication request signal may contain smart key location information from which the current location of the smart key 100 may be checked. For this, the authentication request signal generating unit 143 may obtain a list of APs measured at the smart key 100 through a wireless LAN card included in the smart key communication unit 110. In addition, the authentication request signal generating unit 143 may obtain a GPS sensor value and a geomagnetic sensor value measured at the smart key 100 by means of a GPS sensor and a geomagnetic sensor included in the smart key sensor unit 120. The AP list, the GPS sensor value and the geomagnetic sensor value are information for checking a current location of the smart key 100 and may be used to perform the second authentication process for the smart key 100 at the vehicle authentication module 240. Here, the authentication request signal generating unit 143 may generate smart key location information including all of the AP list, the GPS sensor value and the geomagnetic sensor value.

In addition, the authentication request signal may contain the second random number ($N_2$) included in the response signal received from the vehicle authentication module 240. As described above, the response signal received from the vehicle authentication module 240 contains the second random number ($N_2$) generated by the vehicle authentication module 240. At this time, the second random number ($N_2$) may be encrypted by the symmetric key ($K_s$) or not encrypted. The authentication request signal generating unit 143 may generate the authentication request signal by obtaining the second random number ($N_2$) contained in the response signal, if required, through a decryption process using the symmetric key ($K_s$). The second random number ($N_2$) contained in the authentication request signal may be used in the vehicle authentication module 240 to perform the first authentication process for the smart key 100. This will be described later in detail.

As described above, the authentication request signal generating unit 143 may generate the authentication request signal by encrypting the smart key location information including the AP list, the GPS sensor value and the geomagnetic sensor value and the second random number ($N_2$) by using the symmetric key ($K_s$) and transmit the generated authentication request signal to the vehicle authentication module 240 by means of the smart key communication unit 110. At this time, the authentication request signal generating unit 143 may encrypt the second random number ($N_2$) and the smart key location information by using the symmetric key ($K_s$) according to the AES-128 encryption algorithm.

The smart key memory unit 150 may store a program for processing and controlling the smart key 100 and may perform a function for temporarily storing input/output data. For example, the smart key memory unit 150 may store information such as the inherent ID of the smart key 100, the symmetric key ($K_s$), and the first random number ($N_1$) generated by the smart key control unit 140.

Hereinafter, a method for controlling the smart key 100 depicted in FIG. 4 will be described with reference to FIG. 5.

Figure 5:
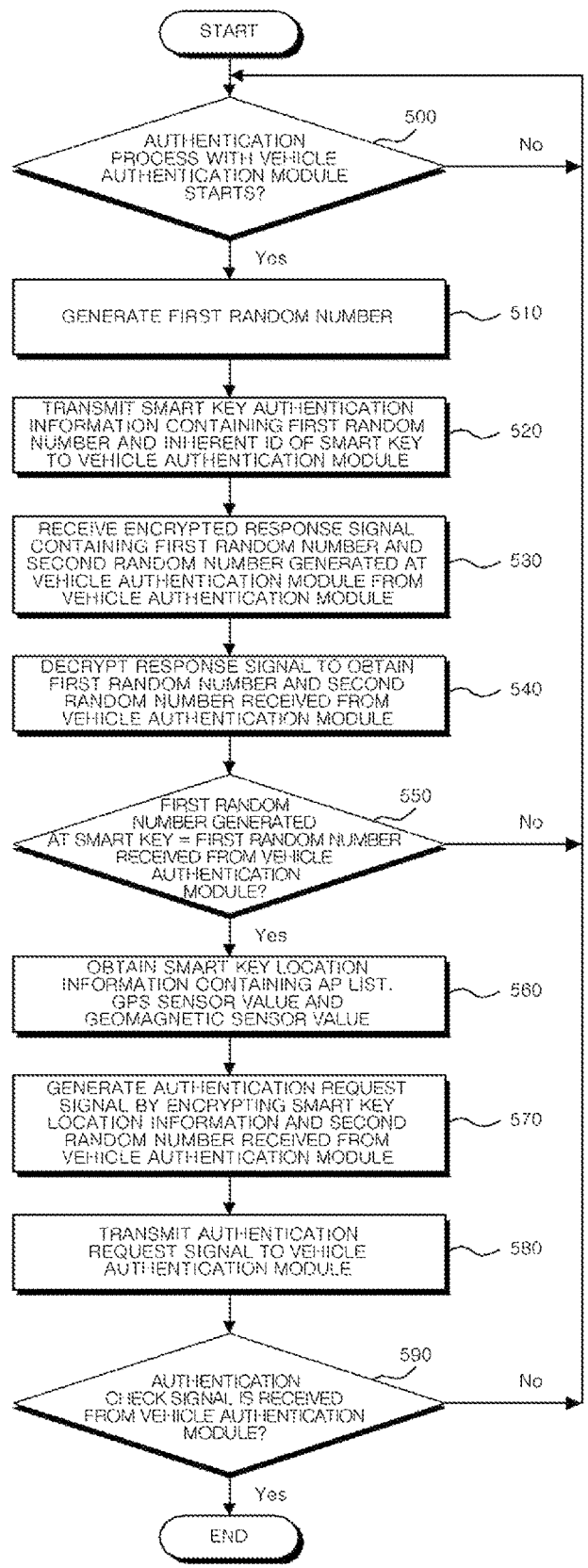
FIG. 5 is a flowchart for illustrating an authentication process performed with a vehicle authentication module at the smart key depicted in FIG. 4.

FIG. 5 is a flowchart for illustrating an authentication process performed with a vehicle authentication module at the smart key depicted in FIG. 4.

Referring to FIG. 5, the smart key 100 may initiate an authentication procedure with the vehicle authentication module 240 (Step 500). For example, the smart key 100 may initiate the authentication procedure with the vehicle authentication module 240 if a user attempts to control the vehicle by using the smart key 100.

Also, if the authentication procedure with the vehicle authentication module 240 is initiated (Step 500), the smart key 100 may generate a first random number (Step 510). In addition, the smart key 100 may transmit smart key authentication information containing the first random number and an inherent ID of the smart key to the vehicle authentication module 240 (Step 520).

Also, the smart key 100 may receive an encrypted response signal containing the first random number and a second random number generated by the vehicle authentication module 240 from the vehicle authentication module 240 as a response to the smart key authentication information (Step 530). At this time, the response signal received from the vehicle authentication module 240 may be encrypted with the symmetric key ($K_s$). In addition, both the first random number and the second random number may be encrypted or only the first random number may be encrypted.

The smart key 100 may decrypt the response signal to obtain the first random number and the second random number received from the vehicle authentication module 240 (Step 540). At this time, the smart key 100 may decrypt the response signal using the symmetric key ($K_s$).

In addition, the smart key 100 may compare the first random number generated by the smart key 100 with the first random number received from the vehicle authentication module 240 (Step 550). This is to check whether the response signal received from the vehicle authentication module 240 is a reliable signal.

If it is checked that the first random number generated from the smart key 100 is identical to the first random number received from the vehicle authentication module 240, the smart key 100 may obtain the smart key location information including an AP list, a GPS sensor value and a geomagnetic sensor value, measured at the smart key 100 (Step 560).

In addition, the smart key 100 may generate the authentication request signal by encrypting the smart key location information and the second random number received from the vehicle authentication module 240 (Step 570), and may transmit the authentication request signal to the vehicle authentication module 240. At this time, the smart key 100 may encrypt the smart key location information and the second random number received from the vehicle authentication module 240 by using the symmetric key ($K_s$).

If the smart key 100 receives the authentication check signal from the vehicle authentication module 240 (Step 590), the smart key 100 determines that the authentication with the vehicle authentication module 240 is completed, and ends the authentication process for the current attempt for vehicle control of the user.

Figure 6:
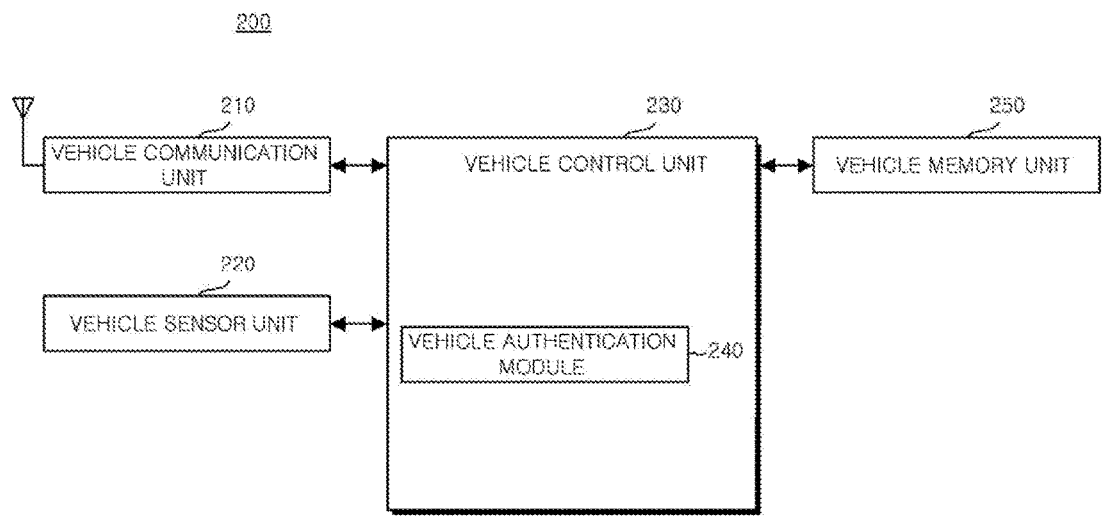
FIG. 6 is a control block diagram for the vehicle depicted in FIG. 2.

Meanwhile, FIG. 6 is a control block diagram for the vehicle depicted in FIG. 2.

Referring to FIG. 6, the vehicle 200 may include a vehicle communication unit 210, a vehicle sensor unit 220, a vehicle control unit 230, and a vehicle memory unit 240. The vehicle 200 performs bidirectional communication with the smart key 100. At this time, for security, the vehicle 200 may perform an authentication procedure for the smart key 100 by including the vehicle authentication module 240. Hereinafter, each component of the vehicle 200 will be described.

The vehicle communication unit 210 enables communication between the vehicle 200 and the smart key 100 and, for this purpose, may be implemented including one or more components that perform wireless communication or near field wireless communication. For example, the vehicle communication unit 210 may be implemented including a component enabling any one of Bluetooth, 3G, 4G, 5G, infrared and wireless LAN communications. By using the vehicle communication unit 210, the vehicle authentication module 240 may transmit or receive predetermined information to/from the smart key 100 in order to perform an authentication procedure for the smart key 100 that attempts to control the vehicle.

In addition, the vehicle communication unit 210 may include a wireless LAN card in order to check location information of the vehicle 200. This is to obtain the AP list among the location information of the vehicle 200 that is required for performing the authentication procedure between the vehicle authentication module 240 and the smart key 100. In other words, the AP list measured at the vehicle 200 may be obtained through the wireless LAN card included in the vehicle communication unit 210, and the vehicle authentication module 240 may perform the authentication process for the smart key 100 by using the AP list. At this time, if the vehicle 200 is out of a building, an AP may not be measured at the vehicle 200, and in this case, the AP list may be empty in the location information of the vehicle 200. However, when the vehicle 200 performs the authentication procedure for the smart key 100 using the AP list, the authentication procedure is performed based on a set of APs measured at the vehicle 200 and a set of APs measured at the smart key 100, and thus, even if an AP is not measured at the vehicle 200, the authentication between the vehicle 200 and the smart key 100 using the AP list may be performed.

The vehicle sensor unit 220 is prepared to obtain the location information of the vehicle, which is necessary to perform the authentication procedure between the vehicle authentication module 240 and the smart key 100, and may be implemented including a GPS sensor and a geomagnetic sensor. The vehicle sensor unit 220 may obtain a GPS sensor value and a geomagnetic sensor value measured by the vehicle 200 by including the GPS sensor and the geomagnetic sensor.

The vehicle control unit 230 may control the overall operation of the vehicle 200. In particular, the vehicle control unit 230 may include the vehicle authentication module 240 to perform the two-stage authentication procedure for the smart key 100. Hereinafter, each component of the vehicle authentication module 240 included in the vehicle 200 will be described with reference to FIG. 7.

Figure 7:
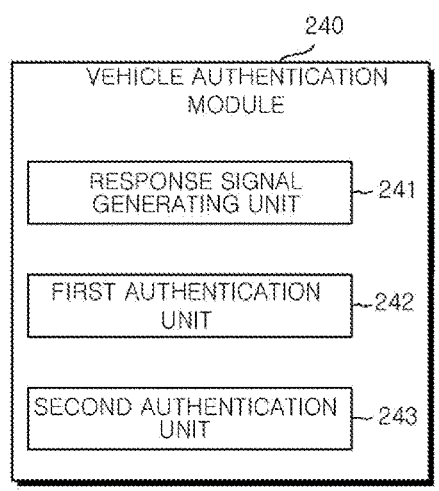
FIG. 7 is a control block diagram for the vehicle authentication module included in the vehicle depicted in FIG. 2.

FIG. 7 is a control block diagram for the vehicle authentication module included in the vehicle depicted in FIG. 2.

Referring to FIG. 7, the vehicle authentication module 240 may include a response signal generating unit 241, a first authentication unit 242 and a second authentication unit 243.

Specifically, the response signal generating unit 241 may generate a response signal in response to the smart key authentication information received from the smart key 100. At this time, the smart key authentication information is transmitted from the smart key 100 to start the authentication procedure and may contain the inherent ID of the smart key 100 and the first random number ($N_1$) generated by the smart key 100. In response to the smart key authentication information, the response signal generating unit 241 may generate the second random number ($N_2$) first and generate a response signal based on the first random number ($N_1$) and the second random number ($N_2$). At this time, the response signal generating unit 241 may generate a new random number whenever receiving the smart key authentication information, and the generated random number may be temporarily stored in the vehicle memory unit 250.

Here, the response signal may include the first random number ($N_1$) contained in the smart key authentication information and the second random number ($N_2$) generated at the response signal generating unit 241 in an encrypted form. Alternatively, the first random number ($N_1$) contained in the smart key authentication information may be encrypted and the second random number ($N_2$) generated by the response signal generating unit 241 may be included in an unencrypted state. The response signal generating unit 241 can generate a response signal by encrypting the first random number ($N_1$) using the stored symmetric key ($K_s$) or encrypting both the first random number ($N_1$) and the second random number ($N_2$). At this time, the response signal generating unit 241 may perform encryption, for example, by using the AES-128 encryption algorithm. The response signal generating unit 241 may generate the response signal in this way and transmit the response signal to the smart key 100 through the vehicle communication unit 210.

The first authentication unit 242 may perform the first authentication for the smart key 100 based on the authentication request signal received from the smart key 100. Here, the authentication request signal is obtained by encrypting the second random number ($N_2$) obtained from the response signal by the smart key 100 and the smart key location information composed of the AP list, the GPS sensor value and the geomagnetic sensor value with the symmetric key ($K_s$). Accordingly, the first authentication unit 242 may obtain the second random number ($N_2'$) received from the smart key 100 by decrypting the authentication request signal using the symmetric key ($K_s$) first. In addition, the first authentication unit 242 may perform the first authentication process for comparing the second random number ($N_2$) generated by the response signal generating unit 241 with the second random number ($N_2'$) obtained by decrypting the authentication request signal received from the smart key 100.

The first authentication unit 242 compares the second random number ($N_2$) generated by the response signal generating unit 241 and transmitted to the smart key 100 with the second random number ($N_2'$) obtained by decrypting the authentication request signal received from the smart key 100, and then if they are comparatively identical, the first authentication unit 242 may permit the first authentication for the smart key 100. Meanwhile, in an opposite case, the first authentication unit 242 may not permit the first authentication for the smart key 100. The first authentication unit 242 may transmit the result of the first authentication for the smart key 100 to the second authentication unit 243, explained later, so that the second authentication process for the smart key 100 is performed or stopped.

The second authentication unit 243 may perform the secondary authentication for the smart key 100 based on the authentication request signal received from the smart key 100. At this time, the second authentication unit 243 may perform the secondary authentication for the smart key 100 only when the first authentication is permitted by the first authentication unit 242. As described above, the authentication request signal is a signal obtained by encrypting the second random number ($N_2$) obtained from the response signal and the smart key location information including the AP list, the GPS sensor value and the geomagnetic sensor value with the symmetric key ($K_s$) at the smart key 100. Accordingly, the second authentication unit 243 may obtain the smart key location information including the AP list, the GPS sensor value and the geomagnetic sensor value by decrypting the authentication request signal by using the symmetric key ($K_s$). In addition, the second authentication unit 243 may obtain the vehicle location information including the AP list, the GPS sensor value and the geomagnetic sensor value, measured at the vehicle 200, and perform the second authentication process for comparing the vehicle location information with the smart key location information.

Meanwhile, when the authentication request signal is decrypted at the first authentication unit 242, the decryption operation may be performed only for the second random number ($N_2$) obtained from the response signal at the smart key 100. After that, if the first authentication for the smart key 100 is permitted, the second authentication unit 243 may decrypt the smart key location information contained in the authentication request signal. As described above, the second authentication is performed only when the first authentication is successful, and thus convenience and efficiency may be improved in the whole system.

Again, the second authentication unit 243 may obtain the vehicle location information including the AP list, the GPS sensor value and the geomagnetic sensor value measured at the vehicle 200, compare the vehicle location information with the smart key location information, and determine that the authentication for the smart key 100 is successful if the comparison result satisfies a predetermined authentication permission condition. In this case, an authentication check signal (ACK) may be sent to the smart key 100, if required. Meanwhile, if the comparison result between the vehicle location information and the smart key location information does not satisfy the predetermined authentication permission condition, the second authentication unit 243 may not permit authentication for the smart key 100.

Here, the second authentication unit 243 may compare the GPS sensor values, the geomagnetic sensor values and the AP lists, respectively included in the vehicle location information and the smart key location information, and then determine whether the authentication for the smart key 100 is successful by checking whether the comparison result of any one location information value among the GPS sensor values, the geomagnetic sensor values and the AP lists satisfies the predetermined authentication permission condition or by checking whether the comparison result of at least two location information values satisfies the predetermined authentication permission condition. Here, in order to improve the security by comparing various location information values, it is desirable to check whether the comparison result of the three location information values satisfies the predetermined authentication permission condition and then determine whether the authentication for the smart key 100 is successful according to the checking result.

For example, the second authentication unit 243 may perform the second authentication process by comparing two location information values including the GPS location value and the geomagnetic sensor value in the vehicle location information and the smart location information as in Equation 1 below to determine whether the smart key 100 is located at a position close to the vehicle.

$$\alpha_1 \times |\vec{v}_{gps}(c) - \vec{v}_{gps}(s)| + \alpha_2 \times |\vec{v}_{mag}(c) - \vec{v}_{mag}(s)| < e \qquad \text{[Equation 1]}$$

In Equation 1, $\vec{v}_{mag}(s)$, $\vec{v}_{gps}(s)$, respectively represents a geomagnetic sensor and a GPS sensor value measured at the vehicle authentication module 240, and $\vec{v}_{mag}(c)$, $\vec{v}_{gps}(c)$ respectively represents a geomagnetic sensor and a GPS sensor value measured at the smart key 100.

In Equation 1, the values of $\alpha_1$, $\alpha_2$ and $\epsilon$ may be set reflecting the fact that the probability that the GPS sensor value and the geomagnetic sensor value are within similar ranges is higher when the smart key 100 is closer to the vehicle. However, in general, in a GPS coordinate, a GPS value measured by a GPS sensor has an error of several meters to several tens of meters, and thus it is desirable to set the size of $\alpha_2$ larger than the size of $\alpha_1$. The second authentication unit 243 may permit the authentication for the smart key 100 if the parameters obtained from the vehicle location information and the smart key location information satisfy Equation 1.

Alternatively, the second authentication unit 243 may perform the second authentication process by comparing the location information values of the AP lists in the vehicle location information and the smart key location information to determine whether the smart key 100 is located at a position close to the vehicle. This will be described with reference to FIG. 8.

Figure 8:
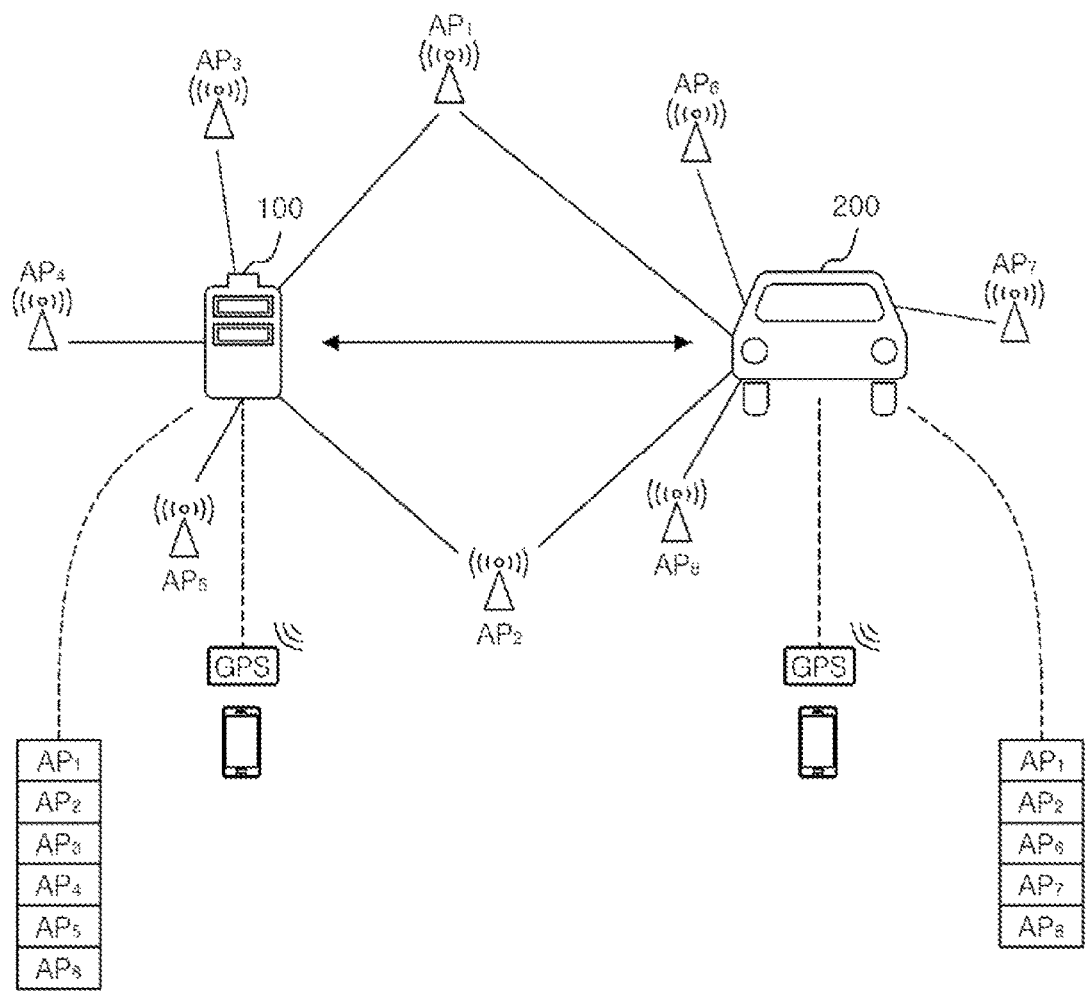
FIG. 8 is a diagram for illustrating a second authentication process for the smart key at the vehicle authentication module.

FIG. 8 is a diagram for illustrating a second authentication process for the smart key at the vehicle authentication module.

Referring to FIG. 8, the smart key 100 and the vehicle 200 may measure AP through a wireless LAN card. Assuming that smart key 100 and vehicle 200 are located very close, the AP information values measured at the smart key 100 and the vehicle 200 will be similar, but in an opposite case, the measured AP information values will be different. Accordingly, the second authentication unit may perform the second authentication process by calculating a common AP ratio, which is a ratio of APs commonly extracted from the smart key 100 and the vehicle 200 among APs included in the AP list extracted from the smart key 100 or the AP list extracted from the vehicle 200, and then checking whether the common AP ratio exceeds a predetermined critical value.

The second authentication unit 243 may define the AP list measured at the smart key 100 as a group $S_u$ and define the AP list measured at the vehicle 200 as a group $S_v$. Here, the common AP ratio, which is a ratio of APs commonly extracted from the smart key 100 and the vehicle 200 among APs included in the AP list measured at the smart key 100 or the AP list measured at the vehicle 200, may be defined as $$CAR = \frac{|S_u \cap S_u|}{|S_u \cup S_u|}.$$

In addition, the second authentication unit 243 may set a critical value ($\delta$) for the common AP ratio. The second authentication unit 243 may determine that the vehicle 200 and the smart key 100 are sufficiently close to each other and permit the authentication for the smart key 100 if the common AP ratio exceeds the critical value ($\delta$). Meanwhile, if the common AP ratio is equal to or lower than the critical value ($\delta$), the second authentication unit 243 may determine that the vehicle 200 and the smart key 100 are far away and then may not permit authentication for the smart key 100.

In FIG. 8, the AP list measured at the smart key 100 is $\{AP_1, AP_2, AP_3, AP_4, AP_5, AP_8\}$, and the AP list measured at the vehicle 200 is $\{AP_1, AP_2, AP_6, AP_7, AP_8\}$. In addition, the AP list measured at both the smart key 100 and the vehicle 200 is $\{AP_1, AP_2, AP_8\}$. Thus, the second authentication unit 243 may calculate the common AP ratio as ⅜. At this time, if it is assumed that the critical value ($\delta$) for the common AP ratio is set to be 0.5, the second authentication unit 243 may not permit the authentication for the smart key 100 because the common AP ratio is lower than the critical value ($\delta$) for the common AP ratio after comparing the common AP ratio, that is ⅜=0.375, with the critical value ($\delta$), that is 0.5.

Meanwhile, referring to FIG. 6, the vehicle memory unit 250 may store a program for processing and controlling the vehicle 200 and may perform a function for temporarily storing input/output data. For example, the vehicle memory unit 250 may store information such as the symmetric key ($K_s$), the second random number ($N_2$) generated by the vehicle authentication module 240, and the like.

Hereinafter, the control method of the vehicle authentication module 240 depicted in FIG. 7 will be described with reference to FIG. 9.

Figure 9:
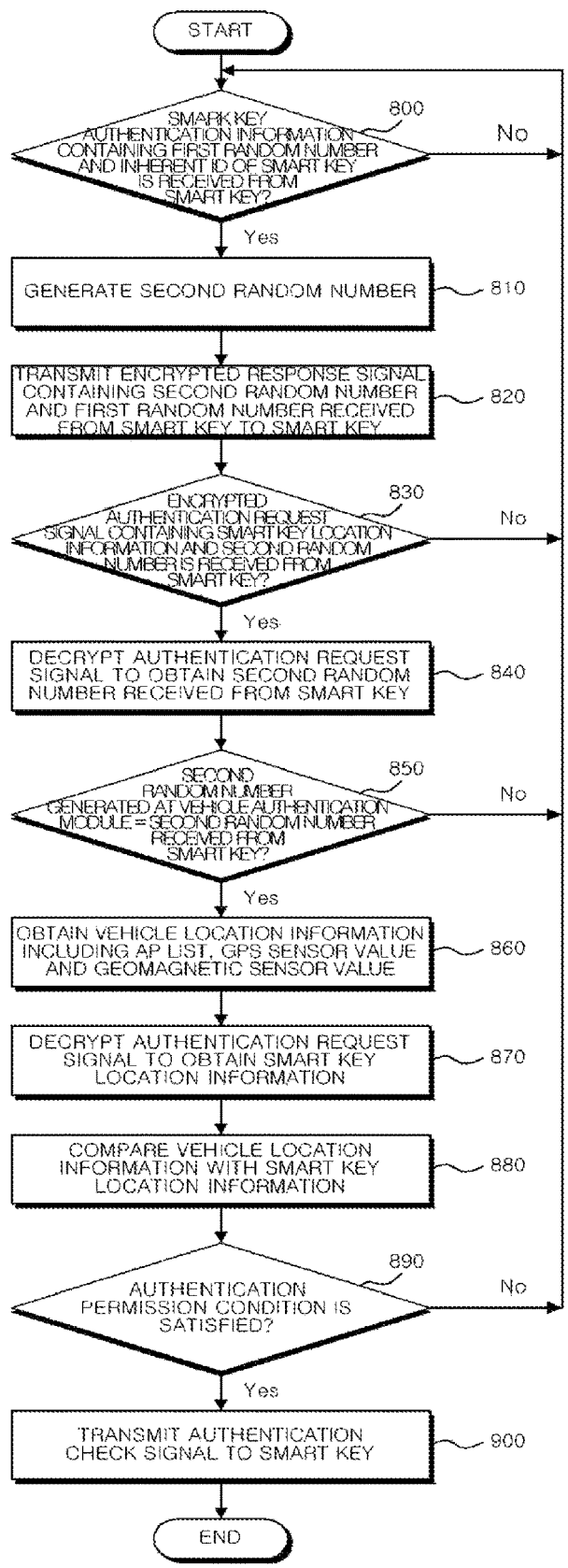
FIG. 9 is a flowchart for illustrating an authentication process for the smart key at the vehicle authentication module depicted in FIG. 7.

FIG. 9 is a flowchart for illustrating an authentication process for the smart key at the vehicle authentication module depicted in FIG. 7.

Referring to FIG. 9, the vehicle authentication module 240 may receive smart key authentication information containing the first random number and the inherent ID of the smart key 100 from the smart key 100 (Step 800). If receiving the smart key authentication information from the smart key 100, the vehicle authentication module 240 may initiate the authentication process for the smart key 100.

If receiving the smart key authentication information from the smart key 100, the vehicle authentication module 240 may generate a second random number (Step 810), and transmit an encrypted response signal, containing the second random number and the first random number received from the smart key, to the smart key 100 (Step 820). At this time, the vehicle authentication module 240 may generate the response signal by encrypting both the first random number and the second random number using the symmetric key ($K_s$) or encrypting only the first random number.

If the vehicle authentication module 240 receives the encrypted authentication request signal containing the smart key location information and the second random number from the smart key 100 responding to the response signal (Step 830), the vehicle authentication module 240 may decrypt the authentication request signal to obtain the second random number received from the smart key 100. The smart key 100 may verify the response signal and then transmit an authentication request signal to the vehicle authentication module 240 according to the verification result. At this time, in the authentication request signal, the smart key location information including the AP list, the GPS sensor value and the geomagnetic sensor value measured at the smart key 100 and the second random number received from the vehicle authentication module 240 to the smart key 100 may be encrypted using the symmetric key ($K_s$). Accordingly, the vehicle authentication module 240 may obtain the second random number received from the smart key 100 by decrypting the authentication request signal by using the symmetric key ($K_s$).

The vehicle authentication module 240 may compare the second random number generated by the vehicle authentication module 240 with the second random number received from the smart key 100 (Step 850). If it is determined that the second random number generated by the vehicle authentication module 240 and the second random number received from the smart key 100 have the same value according to the first authentication process, the vehicle authentication module 240 may permit the first authentication for the smart key 100 and perform the second authentication process.

The vehicle authentication module 240 may obtain the vehicle location information including the AP list, the GPS sensor value and the geomagnetic sensor value if the first authentication for the smart key 100 is permitted in the first authentication process (Step 860).

In addition, the vehicle authentication module 240 may decrypt the authentication request signal received from the smart key 100 to obtain the smart key location information (Step 870), compare the vehicle location information with the smart key location information (Step 880), and determine whether the comparison result satisfies a predetermined authentication permission condition (Step 890). Here, the vehicle location information and the smart key location information respectively include three location information values including the AP list, the GPS sensor value and the geomagnetic sensor value. The vehicle authentication module 240 may compare all of three location information values and check whether the comparison result of any one location information value satisfies the predetermined authentication permission condition, or whether the comparison result of at least two location information values satisfies the predetermined authentication permission condition, or whether the comparison result of all of three location information values satisfies the predetermined authentication permission condition.

If the comparison result of the vehicle location information and the smart key location information satisfies the predetermined authentication permission condition according to the second authentication process, the vehicle authentication module 240 may determine that the smart key 100 and the vehicle 200 are sufficiently close to each other, and permit the certification for the smart key 100. In this case, the vehicle authentication module 240 may terminate the authentication procedure for the current attempt of the user to control the vehicle by transmitting the authentication check signal to the smart key 100 (Step 900).

The vehicle remote key system and the method for authenticating a smart key at the vehicle remote key system may be implemented in the form of program commands executable by various computer components and be recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

The embodiments of the present disclosure have been described in detail with reference to the accompanying drawings, but it would be understood by those skilled in the art that the present disclosure may be modified in various ways without changing essential features of the present disclosure. Therefore, the embodiments described above should be understood as being illustrative in all aspects, rather than restrictive.

What is claimed is:

1. A smart key authentication method for a vehicle remote key system that includes a smart key performing bi-directional communication with a vehicle to control the vehicle and a vehicle authentication module provided at the vehicle to authenticate the smart key, the smart key authentication method comprising:

generating, by the vehicle authentication module, a random number and sharing the random number with the smart key and performing a first authentication process based on the random number; and performing, by the vehicle authentication module, a second authentication process by comparing at least one location information value among an access point (AP) list, a satellite-based positioning sensor value, or a geomagnetic sensor value, which are respectively measured at the vehicle and at the smart key and determining whether or not to permit an authentication to the smart key, wherein the smart key generates a first random number, and when smart key authentication information containing the first random number is transmitted to the vehicle authentication module, the smart key receives a response signal containing the first random number and a second random number generated by the vehicle authentication module, and wherein the smart key verifies the response signal with the first random number, and, when the response signal is verified, the smart key extracts smart key location information including at least one of the AP list, the satellite-based positioning sensor value, and the geomagnetic sensor value; generates an authentication request signal containing the smart key location information and the second random number received from the vehicle authentication module; and transmits the authentication request signal to the vehicle authentication module.

2. The smart key authentication method for a vehicle remote key system according to claim 1, wherein the smart key encrypts the first random number and an inherent ID of the smart key with a stored symmetric key, generate the smart key authentication information, and transmits the smart key authentication information to the vehicle authentication module, and the smart key receives the response signal including the first random number which is encrypted by the vehicle authentication module with the stored symmetric key and the second random number which is generated by the vehicle authentication module and either encrypted or not encrypted by the vehicle authentication module depending on a predetermined setting.

3. The smart key authentication method for the vehicle remote key system according to claim 1, wherein the vehicle authentication module performs the first authentication process by comparing the second random number contained in the authentication request signal with the second random number generated by the vehicle authentication module.

4. The smart key authentication method for the vehicle remote key system according to claim 3, wherein the vehicle authentication module performs the first authentication process by decrypting the authentication request signal with the stored symmetric key and extracting the second random number contained in the authentication request signal received from the smart key, and comparing the second random number contained in the authentication request signal with the second random number generated by the vehicle authentication module.

5. The smart key authentication method for the vehicle remote key system according to claim 1, wherein
the second authentication process is performed when the first authentication for the smart key is permitted in the first authentication process, and
the vehicle authentication module compares the at least one location information value among the AP list, the satellite-based positioning sensor value, or the geomagnetic sensor value, and, when a predetermined authentication permission condition is met, the vehicle authentication module determines to permit the authentication to the smart key.

6. The smart key authentication method for the vehicle remote key system according to claim 5, wherein
when the second authentication process is performed by comparing the location information of the AP list, the vehicle authentication module checks whether a common AP ratio is greater than a predetermined value, the common AP ratio being a ratio of APs commonly included in the AP list measured at the vehicle and the AP list measured at the smart key out of the total of the AP list measured at the vehicle and the AP list measured at the smart key.

7. The smart key authentication method for the vehicle remote key system according to claim 5, wherein
when the second authentication process is performed by comparing the location information of the satellite-based positioning sensor value and the geomagnetic sensor value, the vehicle authentication module checks whether a sum of a value obtained by multiplying a difference between the satellite-based positioning sensor value measured at the vehicle and the satellite-based positioning sensor value measured at the smart key by a predetermined constant, and a value obtained by multiplying a difference between the geomagnetic sensor value measured at the vehicle and a geomagnetic sensor value measured at the smart key by a predetermined constant is smaller than a predetermined value.

8. A vehicle remote key system comprising:
a smart key configured to generate a first random number, when smart key authentication information containing the first random number is transmitted to a vehicle authentication module provided at a vehicle, receiving a response signal containing the first random number and a second random number generated by the vehicle authentication module, verifying the response signal with the first random number, when the response signal is verified, extracting smart key location information including at least one of an AP list, a satellite-based positioning sensor value, and a geomagnetic sensor value, generating an authentication request signal containing the smart key location information and the second random number received from the vehicle authentication module, and transmitting the authentication request signal to the vehicle authentication module; and
the vehicle authentication module configured to perform a first authentication process by comparing the second random number contained in the authentication request signal with the second random number generated by the vehicle authentication module, when a first authentication for the smart key is permitted according to the first authentication process, extracting vehicle location information corresponding to the smart key location information, and performing a second authentication process by comparing the vehicle location information with the smart key location information contained in the authentication request signal, determining whether or not to permit the authentication to the smart key.

9. The vehicle remote key system according to claim 8, wherein the vehicle authentication module includes a second authentication unit configured to compare at least one location information value among the AP list, the satellite-based positioning sensor value and the geomagnetic sensor value included in the vehicle location information and the smart key location information, and to determine to permit the authentication to the smart key when a predetermined authentication permission condition is met.

10. The vehicle remote key system according to claim 9, wherein the second authentication unit checks whether a common AP ratio is greater than a predetermined value, the common AP ratio being a ratio of APs commonly included in the AP list of the vehicle location information and the AP list of the smart key location information among the AP list of the vehicle location information and the AP list of the smart key location information.

11. The vehicle remote key system according to claim 10, wherein the second authentication unit further checks whether a sum of a value obtained by multiplying a difference between the satellite-based positioning sensor value included in the vehicle location information and the satellite-based positioning sensor value included in the smart key location information by a predetermined constant and a value obtained by multiplying a difference between the geomagnetic sensor value included in the vehicle location information and the geomagnetic sensor value included in the smart key location information by a predetermined constant is smaller than a predetermined value.

12. The vehicle remote key system according to claim 8, wherein the smart key encrypts the first random number and an inherent ID of the smart key with a stored symmetric key, generates the smart key authentication information, transmits the smart key authentication information to the vehicle authentication module, and receives the response signal including the first random number which is encrypted by the vehicle authentication module with the stored symmetric key and the second random number which is generated by the vehicle authentication module and either encrypted or not encrypted by the vehicle authentication module depending on a predetermined setting.

13. The vehicle remote key system according to claim 12, wherein the smart key includes a response signal verifying unit verifying the response signal by decrypting the response signal with the stored symmetric key to extract the first random number received from the vehicle authentication module, and comparing the first random number received from the vehicle authentication module with the first random number generated at the smart key.

14. The vehicle remote key system according to claim 13, wherein the smart key includes an authentication request signal generating unit encrypting the smart key location information and the second random number received from the vehicle authentication module with the stored symmetric key to generate the authentication request signal and transmitting the authentication request signal to the vehicle authentication module.

15. The vehicle remote key system according to claim 14, wherein the vehicle authentication module includes a first authentication unit decrypting the authentication request signal with the stored symmetric key to extract the second random number contained in the authentication request signal received from the smart key, and performing the first authentication process by comparing the second random number contained in the authentication request signal with the second random number generated at the vehicle authentication module.

16. A smart key authentication method for a vehicle remote key system that includes a smart key for performing bi-directional communication with a vehicle to control the vehicle and a vehicle authentication module provided at the vehicle to authenticate the smart key, the smart key authentication method comprising:
   generating, by the vehicle authentication module, a random number and sharing the random number with the smart key and performing a first authentication process based on the random number; and
   performing, by the vehicle authentication module, a second authentication process by comparing a first AP list measured at the vehicle and a second AP list measured at the smart key and determining whether to permit the authentication to the smart key.

17. The smart key authentication method for the vehicle remote key system according to claim 16, wherein
   the second authentication process is performed when the first authentication for the smart key is permitted in the first authentication process, and
   the vehicle authentication module checks whether a common AP ratio is greater than a predetermined value, the common AP ratio being a ratio of APs commonly included in the first AP list measured at the vehicle and the second AP list measured at the smart key among the first and second APs.

18. The smart key authentication method for the vehicle remote key system according to claim 16, wherein the smart key generates a first random number, and when smart key authentication information containing the first random number is transmitted to the vehicle authentication module, the smart key receives a response signal containing the first random number and a second random number generated at the vehicle authentication module from the vehicle authentication module, and
   wherein the smart key verifies the response signal with the first random number, and, when the response signal is verified, the smart key extracts smart key location information including an AP list, generates an authentication request signal containing the smart key location information and the second random number received from the vehicle authentication module, and transmits the authentication request signal to the vehicle authentication module.

19. The smart key authentication method for the vehicle remote key system according to claim 18, wherein:
   the vehicle authentication module performs the first authentication process by comparing the second random number contained in the authentication request signal with the second random number generated at the vehicle authentication module.

* * * * *